W. WADSWORTH.
Rotary Cultivator.
No. 43,808.  Patented Aug. 9, 1864.
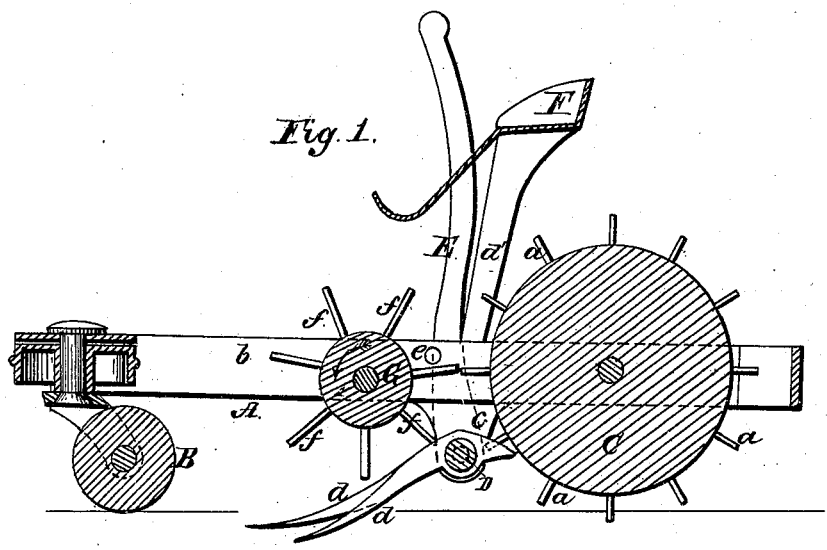
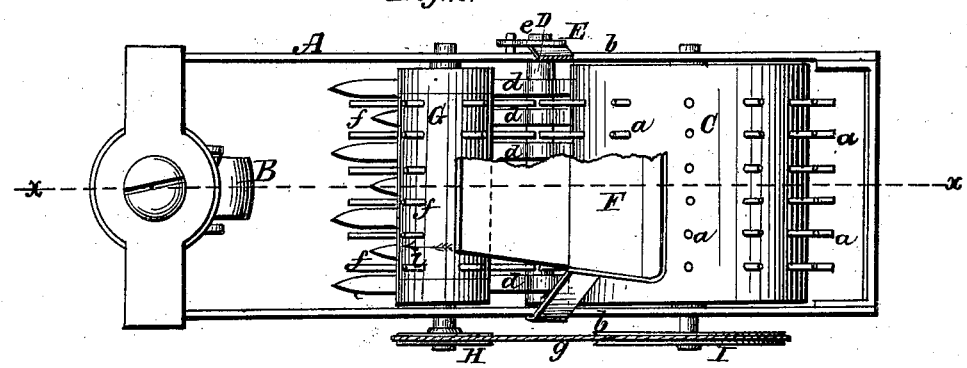
Witnesses.
Inventor.

UNITED STATES PATENT OFFICE.

W. WADSWORTH, OF SACRAMENTO, CALIFORNIA.

DEVICE FOR TILLING THE SOIL.

Specification forming part of Letters Patent No. 43,808, dated August 9, 1864.

*To all whom it may concern:*

Be it known that I, W. WADSWORTH, of Sacramento, in the county of Sacramento and State of California, have invented a new and Improved Implement or Device for Tilling the Soil; and I do hereby declare that the following is a full, clear, and exact description of the same, reference being had to the accompanying drawings, making a part of this specification, in which—

Figure 1 is a side sectional view of my invention, taken in the line $xx$ of Fig. 2. Fig. 2 is a plan or top view of the same.

Similar letters of reference indicate corresponding parts in the two figures.

This invention relates to a new and improved machine for forking up and pulverizing the soil to a requisite depth.

The invention consists in the employment or use of a series of teeth or tines attached to a horizontal shaft placed transversely in a suitable frame and arranged in such a manner that as the machine is drawn or propelled along the teeth or tines will perform their work, and at the same time admit weeds, trash, long or undecomposed manure to pass over the teeth or tines to the rear of the machines, thereby preventing all choking or clogging of the same.

The invention also consists in using, in connection with the teeth or tines aforesaid, a rotary toothed drum, placed above the teeth or tines, for pulverizing the earth as the same is forked up, and also to convey or assist in conveying straw, weeds, and other trash raised by the teeth or tines to the rear of the machine.

The invention further consists in the employment or use of a toothed roller, placed in the frame of machine either at the rear or in the front of the teeth or tines, for the purpose of rolling the soil, and also to serve as a driving-wheel for the toothed drum above-mentioned.

To enable those skilled in the art to fully understand and construct my invention, I will proceed to describe it.

A represents a rectangular frame of any suitable dimensions, and constructed of either metal or wood. The front part of this frame A is supported by a caster-wheel, B, and the back part is supported by a roller, C, having teeth $a$ in its periphery.

The two sides $b$ $b$ of the frame A have each a pendent projection, $c$, and these projections serve as bearings for a shaft, D, which has a series of teeth or tines, $d$, attached to it, said teeth or tines projecting toward the front end of the frame A, and inclining slightly downward, as shown in Fig. 1. The shaft D is allowed to turn in its bearings $c$ $c$, and to one end of said shaft there is attached a lever, E, which extends upward at the outer side of the frame A and by the side of a seat, F, attached to suitable supports, $d'$ $d'$, on the frame A. This lever E, when the machine is at work, bears against a pin, $e$, which serves as a stop to retain the teeth or tines in a suitable inclined position to perform their work.

In the frame A, and directly over the teeth or tines $d$, there is placed a drum, G, which is provided with radial teeth $f$. This drum G has a pulley, H, at one end of it, around which and a pulley, I, at one end of the shaft or axle of the roller C, a belt, $g$, passes.

The operation is as follows: As the machine is drawn along the teeth or tines $d$ penetrate the earth obliquely, owing to their inclined position, and will fork up the ground, while the rotary toothed drum G, which receives its motion from the roller C and rotates in the direction indicated by the arrow 1, will pulverize the earth, and will also force back weeds, straw, and trash to the rear of the machine and cause the teeth or tines $d$ to work perfectly at all times, as they cannot become choked or clogged at any time.

The roller C serves the double purpose of a driver for the drum G and a roller to smooth and press down the soil, the teeth $a$ insuring the rotation of the roller. This roller may be placed either before or in the rear of the teeth or tines $d$. I prefer to have it in front of the latter if the soil contains large lumps, such as are frequently left after a previous plowing, as the roller will crush or pulverize the lumps and render the ground smooth before the teeth or tines.

The teeth or tines may be elevated free from the ground at any time by drawing back the lever E.

The advantage of this invention consists in the ease with which it works, the draft-power required being comparatively small, and the teeth or tines effectually prevented from choking or clogging either by earth or weeds, straw, or long trash on the surface of the soil. The soil also will be thoroughly forked up and pulverized, and left in a far more loose and friable condition than can be done by any agricultural machine for the purpose that has passed under my observation.

Having thus described my invention, what I claim as new, and desire to secure by Letters Patent, is—

1. The employment or use of a series of tines or teeth, $d$, attached to a suitable rock-shaft, D, and having an oblique or inclined position relatively with the surface of the soil to be operated upon, so that as said teeth or tines are propelled or drawn along in the soil the latter will be forked up, while weeds, straw, and similar trash will pass over the teeth or tines to the rear of the machine, substantially as herein set forth.

2. The combination of the teeth or tines $d$, rotary toothed drum G, and roller C, all arranged substantially as and for the purpose specified.

W. WADSWORTH.

Witnesses:
PRESCOTT ROBINSON,
EDWD. C. CHAMBERLIN.